No. 676,520. Patented June 18, 1901.
A. P. WARNER.
ELECTRIC MOTOR.
(Application filed Oct. 22, 1900.)
(No Model.)
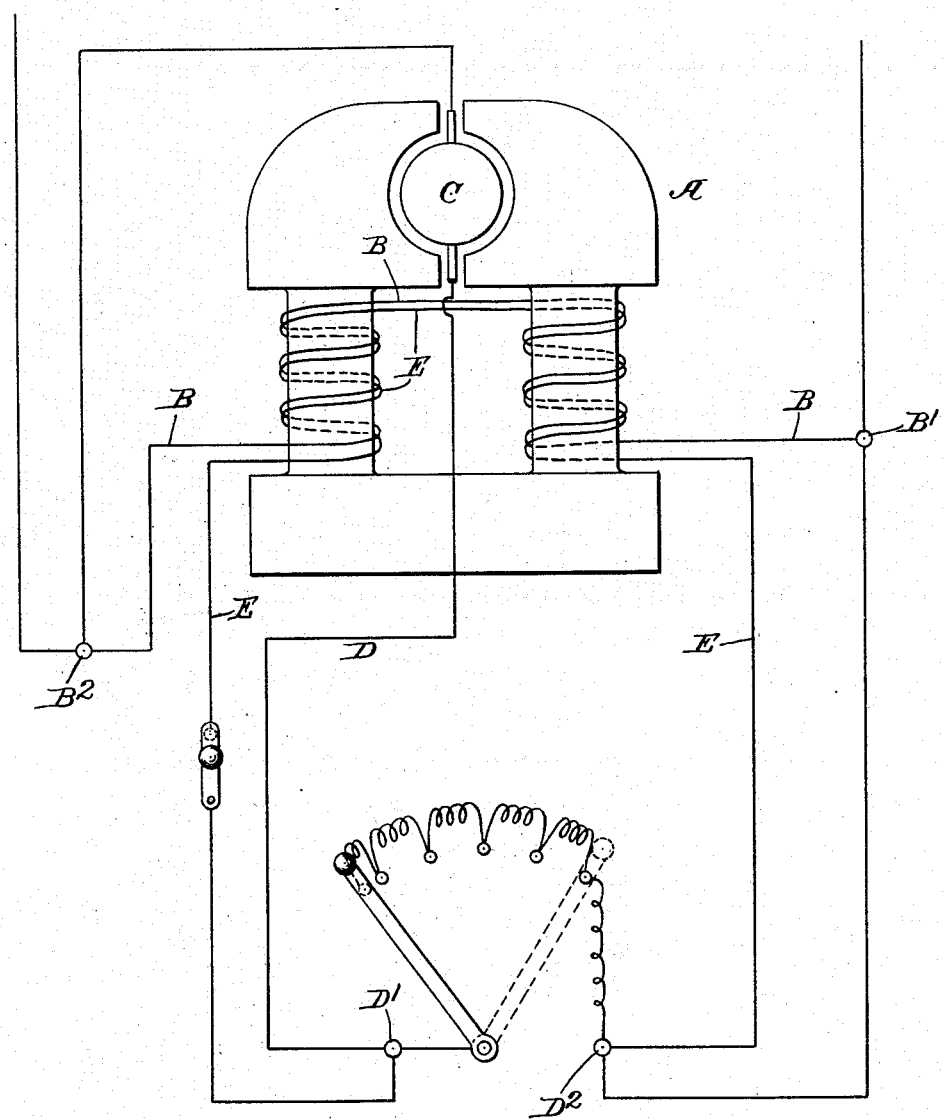

UNITED STATES PATENT OFFICE.

ARTHUR P. WARNER, OF MILWAUKEE, WISCONSIN, ASSIGNOR OF ONE-HALF TO THE NORTHERN ELECTRICAL MANUFACTURING COMPANY, OF MADISON, WISCONSIN.

ELECTRIC MOTOR.

SPECIFICATION forming part of Letters Patent No. 676,520, dated June 18, 1901.

Application filed October 22, 1900. Serial No. 33,850. (No model.)

*To all whom it may concern:*

Be it known that I, ARTHUR P. WARNER, a citizen of the United States, residing at Milwaukee, in the county of Milwaukee and State of Wisconsin, have invented a certain new and useful Improvement in Electric Motors, of which the following is a specification.

My invention relates to electric motors, and has for its object to provide a new and improved motor of this description.

In the accompanying drawing I have shown diagrammatically a motor embodying my invention.

This invention is particularly adapted for motors used under conditions necessitating frequent stopping and starting—such, for example, as motors for elevators, street-cars, and the like.

Referring now to the drawing, I have illustrated diagrammatically a shunt-motor A, provided with the ordinary shunt-windings B around the armature C, and a suitable starting-resistance D in the armature-circuit. The shunt B is connected to the main circuit in any desired manner—as, for example, at the terminals $B'$ $B^2$. The ordinary shunt-motor as now made is not adapted for use in connection with elevators and street-cars. By means of my invention, however, the objections to a shunt-wound motor when used under such conditions are obviated. In carrying out my invention I provide an additional field-winding E, which is wound upon the field-cores of the motor, this shunt being connected across the terminals $D'$ $D^2$ of the rheostat or resistance D. This additional field-winding is made of sufficient resistance to obtain the desired results. This resistance will of course depend upon the conditions to be met. Ordinarily this additional field-winding will have a resistance greater than the starting-resistance, and in many instances this resistance will be five or six times the starting-resistance.

When motors are used in connection with elevators and street-cars, they must have a high starting torque, so that the armature can quickly attain sufficient speed to develop the proper counter electromotive force, and then the field should be weakened, so as to permit a high speed. My invention permits this result to be obtained by the ordinary shunt-motor. When it is desired to start the motor, the arm of the rheostat or starting-resistance is in the position shown in full lines in the drawing, thus interposing all of the resistance D in the armature-circuit. Under these conditions a portion of the current flows through the additional field-winding E, thus reinforcing the ordinary shunt B. This results in a very strong field at the beginning, and hence a high starting torque is obtained. It will readily be seen that the effect of this additional field-winding can be controlled at will by varying its resistance. As the armature of the motor gains speed the starting-resistance D is cut out, and when normal speed is reached the entire resistance is preferably cut out, the arm being in the position shown in dotted lines in the drawing. As the starting-resistance is cut out it will be seen that the current in the additional field-winding decreases and its effect upon the motor decreases, and when all the starting-resistance is cut out very little or no current will be passing through the additional field-winding, and hence it is rendered inoperative. It will thus be seen that by this means a high starting torque is obtained through the agency of an additional field-winding, and then the additional field-winding is automatically, as it were, cut out when the motor has attained speed. I have found that this construction permits a shunt-motor to be used with highly satisfactory results in connection with elevators and street-cars.

In the drawing I have shown the additional field-winding E as being shunted around all of the starting-resistance; but it is evident that this additional field-winding may be arranged in various manners, so as to be around only a portion of this resistance. Such arrangements will of course readily occur to those versed in the art and will depend upon the results desired and the conditions to be met.

I claim—

1. An electric motor, comprising an armature, a shunt field-winding around the armature, a starting-resistance in the armature-circuit, and an additional field-winding in shunt around a part or all of the starting-resistance.

2. The combination with a shunt electric motor of an additional field-winding in shunt around a part or all of the starting-resistance in the armature-circuit, whereby a high starting torque is obtained, the additional field-winding being rendered substantially inoperative when the starting-resistance is cut out of circuit.

ARTHUR P. WARNER.

Witnesses:
DONALD M. CARTER,
HOMER L. KRAFT.